(12) United States Patent
Müller et al.

(10) Patent No.: US 6,860,538 B2
(45) Date of Patent: Mar. 1, 2005

(54) SLIDE RAIL FOR MOTOR-VEHICLE SEAT

(75) Inventors: Torsten Müller, Hilchenbach (DE); Rüdiger Thomas, Haiger (DE)

(73) Assignee: Westfalia Profil/Technik GmbH & Co. KG, Hilchenbach (DE)

( * ) Notice: Subject to any disclaimer, the term of this patent is extended or adjusted under 35 U.S.C. 154(b) by 0 days.

(21) Appl. No.: 10/689,956

(22) Filed: Oct. 21, 2003

(65) Prior Publication Data

US 2004/0084926 A1 May 6, 2004

(30) Foreign Application Priority Data

Oct. 25, 2002 (DE) .......................... 102 49 698

(51) Int. Cl.$^7$ ................................................ B60N 1/00
(52) U.S. Cl. ................ 296/65.13; 248/429; 248/503.1; 297/344.1
(58) Field of Search ....................... 296/65.13; 248/429, 248/430, 503.1; 297/344.1, 344.11

(56) References Cited

U.S. PATENT DOCUMENTS 4,828,214 A * 5/1989 Kanai et al. ................. 248/430
5,529,397 A * 6/1996 Yoshida ........................ 384/47
5,941,495 A 8/1999 Bauer et al.
6,036,157 A 3/2000 Baroin
2002/0084683 A1 * 7/2002 Christopher ........... 297/344.11

FOREIGN PATENT DOCUMENTS

| DE | 9412155 | 3/1994 |
| DE | 19521566 | 1/1997 |
| DE | 29906063 | 7/1999 |

* cited by examiner

Primary Examiner—Joseph D. Pape
(74) Attorney, Agent, or Firm—Herbert Dubno Andrew Wilford

(57) ABSTRACT

A rail assembly has an elongated upwardly open and elongated metal rail fixed to a car-body support and two confronting and inwardly concave flanges forming transversely inwardly directed faces and an elongated metal rail fixed to a motor-vehicle seat, captured between the flanges, and having two transversely outwardly directed faces generally complementary to and bearing with prestress outwardly on the inwardly directed faces. Respective friction-reducing layers on the faces allow the seat rail to slide smoothly in the body rail.

7 Claims, 1 Drawing Sheet

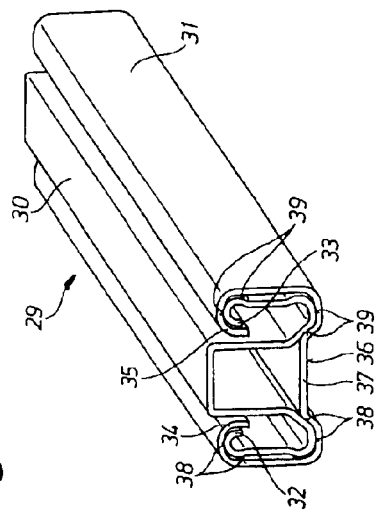
Fig. 3
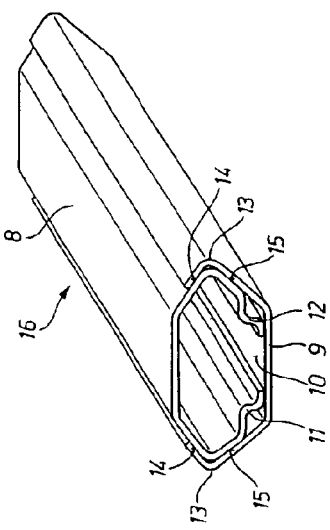
Fig. 4
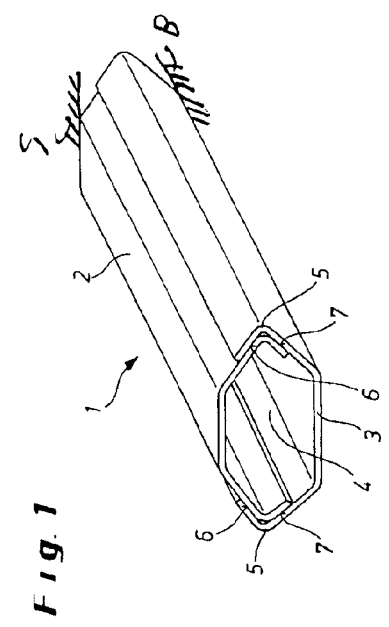
Fig. 1
Fig. 2

SLIDE RAIL FOR MOTOR-VEHICLE SEAT

FIELD OF THE INVENTION

The present invention relates to a slide-rail assembly. More particularly this invention concerns a slide-rail for use in a motor-vehicle seat or the like.

BACKGROUND OF THE INVENTION

It is standard as described in U.S. Pat. No. 6,036,157 of C. Baroin to mount a motor-vehicle seat on a pair of rail assemblies each including a fixed rail secured to the vehicle frame, a movable rail fixed to the seat, and a plurality of roller elements engaged between the rails and supporting the movable rail for longitudinal sliding in the fixed rail. A cage or holder can be provided to maintain the roller elements—balls or cylinders—at a uniform spacing. Such a system is fairly complex, but allows the seat position to be adjusted easily.

A principal disadvantage of this known arrangement is that the load is transferred between the rails at very limited locations, at points in a ball-type system. Thus when there is a great deal of stress, as for instance in an accident when the seat's inertia is suddenly applied transversely via the movable rail to the fixed rail, the result is deformation or da age to the rails. In fact in such a system the rails can separate. Another disadvantage of the known systems is that the numerous parts are expensive to manufacture and, because of their complexity, prone to failure.

OBJECTS OF THE INVENTION

It is therefore an object of the present invention to provide an improved slide-rail assembly.

Another object is the provision of such an improved slide-rail assembly, in particular one for mounting a seat in a motor vehicle, which overcomes the above-given disadvantages, that is which is very strong while still being inexpensive to manufacture.

SUMMARY OF THE INVENTION

A rail assembly has according to the invention an elongated upwardly open and elongated metal rail fixed to a car-body support and two confronting and inwardly concave flanges forming transversely inwardly directed faces and an elongated metal rail fixed to a motor-vehicle seat, captured between the flanges, and having two transversely outwardly directed faces generally complementary to and bearing with prestress outwardly on the inwardly directed faces. Respective friction-reducing layers on the faces allow the seat rail to slide smoothly in the body rail.

The prestressing, which is achieved by making the outer dimensions of the inner rail slightly larger than the inner dimensions of the outer rail so that the inner rail is deformed elastically inward and the outer rail elastically outward when they are fitted together, ensures that the rails do not rattle and therefore hold the car seat or other item supported on the movable upper rail solidly. The friction-reducing layer, which according to the invention can be a layer of Teflon™ or nitriding on a rail of cold-rolled steel, ensures that, in spite of the tight fit, the rails move smoothly relative to each other. Friction can be further reduced by providing between the engaged friction layers a lubricant, e.g. a silicone grease. The inner and outer surfaces of the rails, as mentioned above, are formed as profiles from strips of cold-rolled steel. The two rails engage each other in full-length surface contact so that enormous transverse forces can be withstood without plastic deformation or even sufficient elastic deformation to release them from each other. Normally two such rail assemblies are provided to carry the vehicle seat.

The rail assembly according to the invention is much simpler than the prior-art roller-type assembly, so that it can be made it much lower cost. In addition the rails do not have to be painted or lacquered, as the friction coating completely covers all the surfaces of the rails and adequately protects them from corrosion.

The engaging slide faces according to the invention each have a pair of planar portions extending at an angle of less than 180 to each other and meeting at a corner. The rails thus engage each other over these planar surfaces for excellent transverse force transmission.

The upwardly open rail can have an integral and horizontal floor web bridging the flanges and the upper rail can have downwardly extending L-shaped lips riding on the floor web. This ensures that the weight of the seat is carried by the floor web.

In another system according to the invention the rail fixed to the seat has a downwardly open U-section central web having lower edges and respective outwardly convex outer flanges projecting upward from the lower edges and forming the respective faces. The flanges can be of C-section and interfit complementarily. This provides considerable surfaces for transverse force transmission and makes both of the rails very stiff. The outer flanges can be provided with overhanging lips that effectively capture the inner flanges.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing:

FIG. 1 is a partly diagrammatic perspective end view of a rail assembly according to the invention; and FIGS. 2 through 4 are perspective end views of further rail assemblies in accordance with the invention.

SPECIFIC DESCRIPTION

As seen in FIG. 1 a rail assembly 1 is intended for use between a car seat shown schematically at S and the floor of a car body shown schematically at B. It basically comprises a metallic upper rail 2 fixed to the seat S and a generally complementary metallic lower rail 3 fixed to the body B. The two rails 1 and 2 define a longitudinally extending open space 4 that can accommodate an unillustrated threaded spindle arrangement that longitudinally shifts the upper rail 2 relative to the lower rail 3 to adjust the position of the seat S on the body B.

The upper rail 2 has a pair of downwardly extending flanges and the lower rail 3 has a pair of complementary upwardly extending flanges that bear on the upper-rail flanges at two planar surfaces 6 and 7 meeting at corners 5. The surface of the upper rail 2 has a coating of friction-reducing material, e.g. polytetrafluoroethylene or nitriding, and the surfaces of the lower rail 3 are similarly coated. Furthermore the rails 2 and 3 are dimensioned such that the inner upper rail 2 bears outward with prestress on the outer lower rail 3, eliminating any possibility of rattling or looseness while the friction coating still allows the two rails 2 and 3 to slide easily relative to each other.

In FIG. 2 a rail assembly 16 comprises an upper rail 8 and a lower rail 9, the latter having a planar floor web 10 engaged by downwardly extending L-section lips 11 and 12 of the upper rail 8. In addition the flanges of the rails 8 and 9 bear on each other at coated surfaces 14 and 15 meeting at corners 13.

The rail assembly 17 of FIG. 3 has an upper rail with a downwardly open squared and U-section central web 18 having lower edges 20 and 21 that ride at 27 and 28 on the floor web of the rail 19 and from which extend outwardly convex flanges captured by inwardly turned edges 22 and 23 of the outer flanges, with the flanges riding on each other at surfaces 24 and 25 meeting at corners 26. Thus the edges or lips 22 and 23 capture the seat rail effectively while the planar central part of the web 18 provides a good mounting surface for the seat S.

The rail assembly 29 of FIG. 4 has an upper seat rail 30 and lower body rail 31. The flanges here are all of C-section and the outer rail 31 has a raised floor 37 forming a downwardly open longitudinally extending groove 36 that stiffens this rail 32. The flanges meet at rounded upper and lower surfaces 38 and 39 and the outer flanges of the lower rail 31 have downwardly concave upper lips 34 and 35 that effectively capture the inner rail 30.

We claim:

1. In combination with a motor-vehicle seat and a car-body support, an assembly comprising:

an elongated upwardly open and elongated metal rail fixed to the support and two confronting and inwardly concave flanges forming transversely inwardly directed faces;

an elongated metal rail fixed to the seat, captured between the flanges, and having two transversely outwardly a directed faces generally complementary to and bearing with prestress outwardly on the inwardly directed faces; and respective friction-reducing layers on the faces.

2. The car-seat rail assembly defined in claim 1 wherein each of the faces has a pair of planar portions extending at an angle of less than 180° to each other and meeting at a corner.

3. The car-seat rail assembly defined in claim 2 wherein the upwardly open rail has an integral and horizontal floor web bridging the flanges and the upper rail has downwardly extending L-shaped lips riding on the floor web.

4. The car-seat rail assembly defined in claim 2 wherein the rail fixed to the seat has a downwardly open U-section central web having lower edges and respective outwardly convex outer flanges projecting upward from the lower edges and forming the respective faces.

5. The car-seat rail assembly defined in claim 2 wherein the rail fixed to the seat has a downwardly open U-section central web having lower edges and respective C-section outer flanges projecting upward from the lower edges, forming the respective faces, and having rounded upper and lower lips, the inwardly concave flanges being of C-section and complementary to the C-section outer flanges of the rail fixed to the seat.

6. The car-seat rail assembly defined in claim 1 wherein the layers are polytetrafluoroethylene.

7. The car-seat rail assembly defined in claim 1 wherein the layers are nitriding.

* * * * *